July 7, 1953  A. V. L. C. DEBRIE  2,644,646
FILM MAGAZINE
Filed May 10, 1950
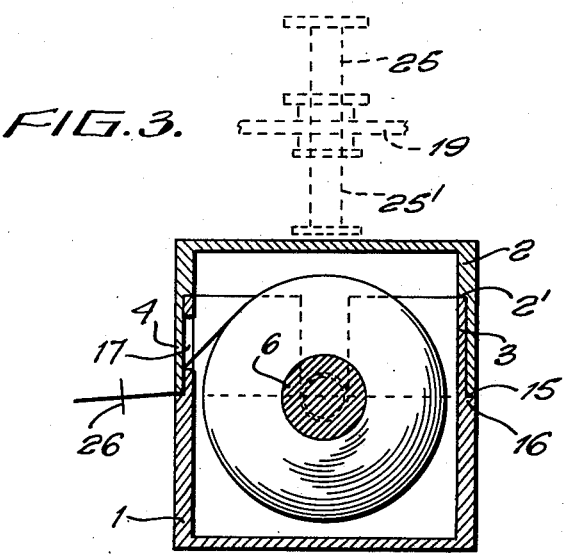
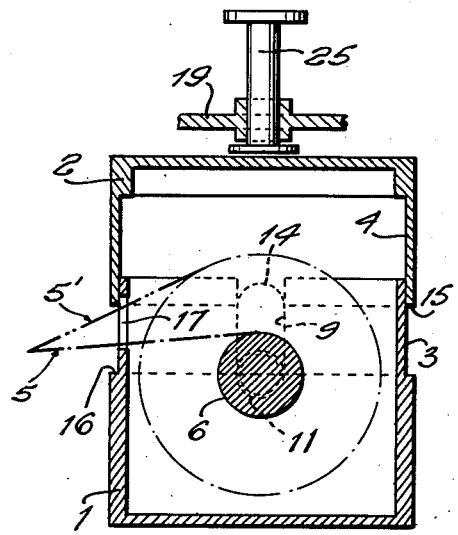
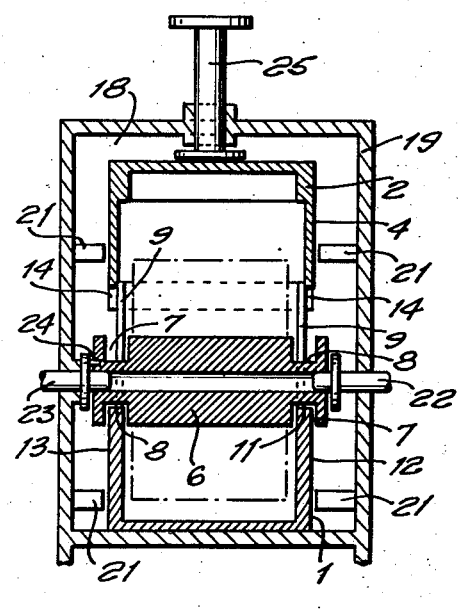
INVENTOR.
ANDRÉ VICTOR LEON
CLEMENT DEBRIE
BY Patented July 7, 1953

2,644,646

UNITED STATES PATENT OFFICE 2,644,646

FILM MAGAZINE

André Victor Leon Clement Debrie, Paris, France

Application May 10, 1950, Serial No. 161,154
In France May 21, 1949

7 Claims. (Cl. 242—71)

This invention relates to a novel film magazine box adapted to be introduced open in a photographic camera, to receive the exposed film and, after having been closed by actuation of a push-button fittted on said camera, to be extracted therefrom in broad daylight with the film safely enclosed therein.

The preservation and filing of the film spool after treatment may be carried out by placing the wound film into this magazine box the shape of which facilitates the setting in order thereof and the sticking of labels bearing useful indications in connection with the content.

Owing to the simple shape of this magazine box it is possible to manufacture it by moulding cardboard or plastics or other suitable materials at a very moderate and therefore advantageous cost.

Preferably, a magazine box of this type is suitable for micro-film spools for a film length of the order of about ten yards, for example, and it is particularly useful for micro-film photograph-taking cameras adapted to receive such magazines.

In the accompanying drawing there is shown diagrammatically by way of example an embodiment of the invention.

In the drawing:

Fig. 1 is a cross-sectional elevation of the receiving magazine box positioned in film-receiving conditions in the photographic camera.

Fig. 2 is a corresponding elevational cross-section through the axis of the film-winding spool.

Fig. 3 is another elevational cross-section of the closed magazine box placed inside the camera and ready for extraction therefrom in broad daylight.

In the different figures of the drawing the same reference numbers are used for designating similar component parts.

1 is a box body having an open top. 2 is the cover therefor. This cover fits in a light-tight manner on the body 1. The walls of body 1 and cover 2, for example, are thinner at their interfitting portions and overlap each other when the cover is fitted thoroughly on the box body i. e. in the closed condition, where the top edge of box body 1 engages shoulder 2' of cover 2.

In this case portions 3 and 4, which if taken separately are thinner than the walls of the box, have the same thickness as these walls when put together.

In its closed condition this box will offer as a rule substantially square-shaped sides at right angles with the axis of the film winding spool.

The film 5 is wound about a cylindrical core 6 provided with grooves 7 having their hubs 8 journaled in parallel-sided notches 9 with semi-circular bottoms 11 cut out from portions 3 of opposite walls 12 and 13 of box 1.

The upper half-bearings of grooves 7 are formed of a pair of semi-circular notches 14 cut out from the corresponding lower edges 15 of cover 2. When cover 2 is fitted fully on body 1, hubs 8 consisting of the bottoms of grooves 7 are clamped by the aforesaid semi-circular portions 11 and 14 whereby, in combination with the staggered joint formed by grooves 7 and the engagement of edges 15 with shoulders 16 forming the lower end of portion 3, the magazine will be entirely light-tight in its closed condition.

In one of the thinner walls 3 parallel with the axis of spool 6 a rectangular window 17 is formed with its longer sides parallel with this axis. The film may pass freely through this window between its position 5 at the beginning of the winding operation and its position 5' when it is fully wound.

By construction, the fitting of parts 3 into parts 4 is sufficiently tight so that 4 will remain in a moderately encased position on 3 while the edge 15 held above the window 17 lets this window free for the passage of film 5 during the winding thereof.

The box 1 fitted with its cover 2 thus positioned for permitting the passage of film 5 is introduced into a compartment 18 of the camera casing illustrated diagrammatically at 19.

The film 5 is fed, through a light-tight device of known design which it is not necessary to describe, into this compartment 18 and its initial end is fixed in any suitable manner on the core 6 after passing through window 17 and before putting the spool in and cover 2 on the box body 1.

Distance pieces 21 carried by walls 19 are provided for retaining the magazine box in place. The arrangement further comprises a pair of journals 22, 23 adapted to center the spool by penetrating in an axial bore of core 6 thereof in the usual manner.

One of these journals, for instance 23, is connected in a rigid manner to the spool core so as to drive it for example through a pin 24 fast with the journal and engaging a suitable cavity of the corresponding end face of core 6.

An elongated pin member for instance of the type illustrated at 25 is provided so that the operator, by pushing it from 25 to 25' (Fig. 3) through a bore in the top wall 19 of the camera, may push the cover fully to its bottom position and thus close the box hermetically.

During this downward movement the film is clamped by the cover between walls 3 and 4 and after compartment 19 has been opened by means not shown the film is cut at 26. The light-sealed box 1, 2 may be therefore extracted and forwarded to the laboratory for treating the film.

When this treatment is over the film may be put away and sheltered in the magazine box duly labelled for classification purposes.

What I claim is:

1. A film magazine, comprising in combination, a bottom box portion having an outer surface, an open top, a bottom wall, a pair of end walls, a pair of side walls and a top edge, one of said end walls being formed with an opening passing therethrough and located adjacent said top edge and said side and end walls being of a lesser thickness adjacent said top edge than adjacent said bottom wall and being formed with a shoulder extending around said walls and located on said outer surface between said opening and bottom wall; and a top box portion mating with said bottom box portion and having an inner surface, an open bottom, a top wall, a pair of end walls, a pair of side walls, and a bottom edge, said walls of said top box portion being of a lesser thickness adjacent said bottom edge than said top wall and being formed with a shoulder located on said inner surface between said bottom edge and top wall, said shoulder of said top box portion being located at a distance from said bottom edge thereof equal to the distance between said shoulder of said bottom box portion and said top edge thereof and said inner surface of said top box portion adjacent said bottom edge thereof frictionally and slidably engaging said outer surface of said bottom box portion adjacent said top edge thereof so that said top box portion is movable from one position where said bottom edge thereof is located between said shoulder and top edge of said bottom box portion to uncover said opening in the latter to another position where said bottom edge of said top box portion is located against said shoulder of said bottom box portion and said top edge of said bottom box portion is located aaginst said shoulder of said top box portion so as to completely cover said opening.

2. A film magazine, comprising in combination, a first box portion having an open bottom, an end wall facing said open bottom, and four side walls terminating in a bottom edge; and a second box portion having an open top, an end wall facing said open top, and four side walls terminating in a top edge, each of said box portions having an inner and an outer surface and a shoulder located on said walls thereof between said end wall and edge, and said shoulders of said box portions being located at the same distance from said edges thereof, respectively, one of said box portions having said shoulder thereof located on said outer surface thereof and the other of said box portions having said shoulder thereof located on said inner surface thereof, and said side walls of each of said box portions being of a lesser thickness from said shoulder to said edge thereof than from said shoulder to said end wall thereof, and one of said side walls being formed with an opening passing therethrough and located between said edge and shoulder thereof, said outer surface of said one box portion adjacent said edge thereof frictionally engaging said inner surface of said other box portion adjacent said edge thereof so that said box portions slidably and frictionally engage each other for movement between one position where said opening in said one side wall is uncovered and another position where said opening is completely covered and said edge of each box portion abuts against said shoulder of the other box portion.

3. A film magazine, comprising in combination, a bottom box portion having an outer surface, an open top, a bottom wall, a pair of end walls, a pair of side walls and a top edge, said side walls each being formed with a recess in an intermediate part thereof and extending from said top edge to a point intermediate the latter and said bottom wall and one of said end walls being formed with an opening passing therethrough and located adjacent said top edge, and said side and end walls being of a lesser thickness adjacent said top edge than adjacent said bottom wall and being formed with a shoulder extending around said walls and located on said outer surface between said opening and bottom wall; and a top box portion mating with said bottom box portion and having an inner surface, an open bottom, a top wall, a pair of end walls, a pair of side walls, and a bottom edge, said side walls of said top box portion each being formed with a recess in an intermediate part thereof and extending from said bottom edge to a point intermediate the latter and said top wall and said walls of said top box portion being of a lesser thickness adjacent said bottom edge than said top wall and being formed with a shoulder located on said inner surface between said bottom edge and top wall, said shoulder of said top box portion being located at a distance from said bottom edge thereof equal to the distance between said shoulder of said bottom box portion and said top edge thereof and said inner surface of said top box portion adjacent said bottom edge thereof frictionally and slidably engaging said outer surface of said bottom box portion adjacent said top edge thereof so that said top box portion is movable from one position where said bottom edge thereof is located between said shoulder and top edge of said bottom box portion to uncover said opening in the latter to another position where said bottom edge of said top box portion is located against said shoulder of said bottom box portion and said top edge of said bottom box portion is located against said shoulder of said top box portion so as to completely cover said opening, said recesses of said top box portion respectively being aligned with said recesses of said bottom box portion so that said box portions in said other position thereof may enclose a film spool having ends extending beyond said side walls while sealing off light from the interior of said box portions.

4. A camera, comprising in combination, a housing having a wall thereof formed with a bore passing therethrough; an elongated pin member mounted for slidable movement along the length thereof in said bore; a first box portion having an open bottom, an end wall facing said open bottom, and four side walls terminating in a bottom edge; and a second box portion having an open top, an end wall facing said open top, and four side walls terminating in a top edge, each of said box portions having an inner and an outer surface and a shoulder located on said walls thereof between said end wall and edge, and said shoulders of said box portions being located at the same distance from said edges thereof, respectively, one of said box portions having said shoulder thereof located on said outer surface thereof and the other of said box portions having said shoulder thereof located on said inner surface thereof, and said side walls of each of said box portions being of a lesser thickness from said shoulder to said edge thereof than from said shoulder to said end wall thereof, and one of said side walls being formed with an opening passing therethrough and located between said edge and shoulder thereof, said outer surface of said one box portion adjacent said edge thereof frictionally engaging said inner surface of said other box portion adjacent said edge thereof so that said box portions slidably and frictionally engage each other for movement between one position where said opening in said one side wall is uncovered and another position where said opening is completely covered and said edge of each box portion abuts against said shoulder of the other box portion, said box portions being removably located in said housing with one of said end walls located adjacent to said pin member and extending transversely to the length of the same so that said pin member may be actuated to move said box portions from said one position to said other position thereof within said housing.

5. A camera, comprising in combination, a housing having a wall thereof formed with a bore passing therethrough; an elongated pin member mounted for slidable movement along the length thereof in said bore; a first box portion having an open bottom, an end wall facing said open bottom, and four side walls terminating in a bottom edge; a second box portion having an open top, an end wall facing said open top, and four side walls terminating in a top edge, each of said box portions having an inner and an outer surface and a shoulder located on said walls thereof between said end wall and edge, and said shoulders of said box portions being located at the same distance from said edges thereof, respectively, one of said box portions having said shoulder thereof located on said outer surface thereof and the other of said box portions having said shoulder thereof located on said inner surface thereof, and said side walls of each of said box portions being of a lesser thickness from said shoulder to said edge thereof than from said shoulder to said end wall thereof, and one of said side walls being formed with an opening passing therethrough and located between said edge and shoulder thereof, said outer surface of said one box portion adjacent said edge thereof frictionally engaging said inner surface of said other box portion adjacent said edge thereof so that said box portions slidably and frictionally engage each other for movement between one position where said opening in said one side wall is uncovered and another position where said opening is completely covered and said edge of each box portion abuts against said shoulder of the other box portion, said box portions being removably located in said housing with one of said end walls located adjacent to said pin member and extending transversely to the length of the same so that said pin member may be actuated to move said box portions from said one position to said other position thereof within said housing, each of said box portions having two opposite side walls other than said one side wall and each formed with a recess extending from said edge towards said end wall thereof and terminating in a semicircular edge portion intermediate said edge and end wall thereof, said recesses of each box portion respectively overlapping said recesses of the other box portion in said other position of said box portions where said semicircular edge portions of each pair of overlapping recesses cooperate to form a circle; and a film spool located in said second box portion, extending across said opposite side walls thereof and having a pair of opposite ends respectively adjacent which said film spool is formed with a pair of annular grooves in which said semicircular edge portions of said recesses of said second box portion are respectively located when said box portions are in said one position thereof and in which said semicircular edge portions of all of said recesses are located when said box portions are in said other position thereof.

6. A film magazine, comprising in combination, a first box portion having an open bottom, an end wall facing said open bottom, and four side walls terminating in a bottom edge; a second box portion having an open top, an end wall facing said open top, and four side walls terminating in a top edge, each of said box portions having an inner and an outer surface and a shoulder located on said walls thereof between said end wall and edge, and said shoulders of said box portions being located at the same distance from said edges thereof, respectively, one of said box portions having said shoulder thereof located on said outer surface thereof and the other of said box portions having said shoulder thereof located on said inner surface thereof, and said side walls of each of said box portions being of a lesser thickness from said shoulder to said edge thereof than from said shoulder to said end wall thereof, and one of said side walls being formed with an opening passing therethrough and located between said edge and shoulder thereof, said outer surface of said one box portion adjacent said edge thereof frictionally engaging said inner surface of said other box portion adjacent said edge thereof so that said box portions slidably and frictionally engage each other for movement between one position where said opening in said one side wall is uncovered and another position where said opening is completely covered and said edge of each box portion abuts against said shoulder of the other box portion, each of said box portions having two opposite side walls other than said one side wall and each formed with a recess extending from said edge towards said end wall thereof and terminating in a semicircular edge portion intermediate said edge and end wall thereof, said recesses of each box portion respectively overlapping said recesses of the other box portion in said other position of said box portions where said semicircular edge portions of each pair of overlapping recesses cooperate to form a circle; and a film spool located in said second box portion, extending across said opposite side walls thereof and having a pair of opposite ends respectively adjacent which said film spool is formed with a pair of annular grooves in which said semicircular edge portions of said recesses of said second box portion are respectively located when said box portions are in said one position thereof and in which said semicircular edge portions of all of said recesses are located when said box portions are in said other position thereof.

7. A film magazine, comprising in combination, a first, open-top box portion having side walls terminating in a top edge; a second, open-bottom box portion having side walls terminating in a bottom edge, said side walls of one of said box portions frictionally and slidably engaging said side walls of the other of said box portion and being formed with a shoulder located at a predetermined distance from said edge of said one box portion to engage said edge of said other box portion, one of said side walls being formed with an opening passing therethrough and spaced from said edge of said one side wall by a distance which is less than said predetermined distance, so that said box portions are mutually movable between one position where said opening is uncovered and another position where said opening is completely covered and said edge of said other box portion engages said shoulder.

ANDRÉ VICTOR LEON CLEMENT DEBRIE.

References Cited in the file of this patent

UNITED STATES PATENTS

| Number | Name | Date |
|---|---|---|
| 1,954,328 | Sauer | Apr. 10, 1934 |

FOREIGN PATENTS

| Number | Country | Date |
|---|---|---|
| 572,374 | France | Feb. 20, 1924 |
| 703,536 | Germany | Mar. 11, 1941 |